United States Patent [19]

Van Der Linden et al.

[11] Patent Number: 5,089,763

[45] Date of Patent: Feb. 18, 1992

[54] BATTERY CHARGING UNIT FOR A MEDICAL APPLIANCE

[75] Inventors: Klaus Van Der Linden, Kronach; Siegfried Wunder, Mitwitz, both of Fed. Rep. of Germany

[73] Assignee: Siemens Aktiengesellschaft, Munich, Fed. Rep. of Germany

[21] Appl. No.: 449,704

[22] Filed: Dec. 11, 1989

[30] Foreign Application Priority Data

Dec. 12, 1988 [DE] Fed. Rep. of Germany ....... 3841820

[51] Int. Cl.$^5$ .............................................. H02J 7/00
[52] U.S. Cl. ......................................... 320/20; 320/23; 320/38; 320/48
[58] Field of Search ..................... 320/14, 20, 22, 23, 320/37, 38, 48

[56] References Cited

U.S. PATENT DOCUMENTS

| | | | |
|---|---|---|---|
| 4,019,112 | 4/1977 | Saton | 320/48 |
| 4,551,666 | 11/1985 | Wada et al. | 320/38 X |
| 4,554,500 | 11/1985 | Sokira | 320/37 X |
| 4,673,862 | 6/1987 | Wahlstrom | 320/23 X |
| 4,857,820 | 8/1989 | Tompkins et al. | 320/39 X |

FOREIGN PATENT DOCUMENTS 0258637 3/1988 European Pat. Off. .

OTHER PUBLICATIONS

Waters, "Automatic Nickel Cadmium Battery Tester", Electronic Engineering, Jan. 1978, p. 19.
"Ladeautomatic Fuer NiCad-Akkus", Elektor, Jan. 1979, pp. 1-45 to 1-47.
"Vorlaeufige Technische Daten Fuer Entwicklungbmuster Monolithisch Integrierte Schaltung", Telefunken Electronic, Feb. 1988, p. 12.

Primary Examiner—Steven L. Stephan
Assistant Examiner—Kristine Peckman
Attorney, Agent, or Firm—Herbert L. Lerner; Laurence A. Greenberg

[57] ABSTRACT

A battery charging unit for a medical appliance, preferably an inhalator, includes a transformer having a high-voltage side to be connected to a mains voltage and having a low-voltage side. A rectifier is connected to the low-voltage side of the transformer. A charge current circuit is connected to the rectifier for charging a battery. A timing control is connected to the charge current circuit for switching a charge current to a value being safe for long-term charging after a predetermined period of time at an initially higher value. A test key is connected to the charge current circuit for interrupting charging of the battery and loading the battery with a given maximum current requirement for a given period of time. The voltage of the battery under load is measured and compared with a predetermined reference voltage after the test key is actuated. A control light signals if the reference voltage is exceeded.

7 Claims, 1 Drawing Sheet

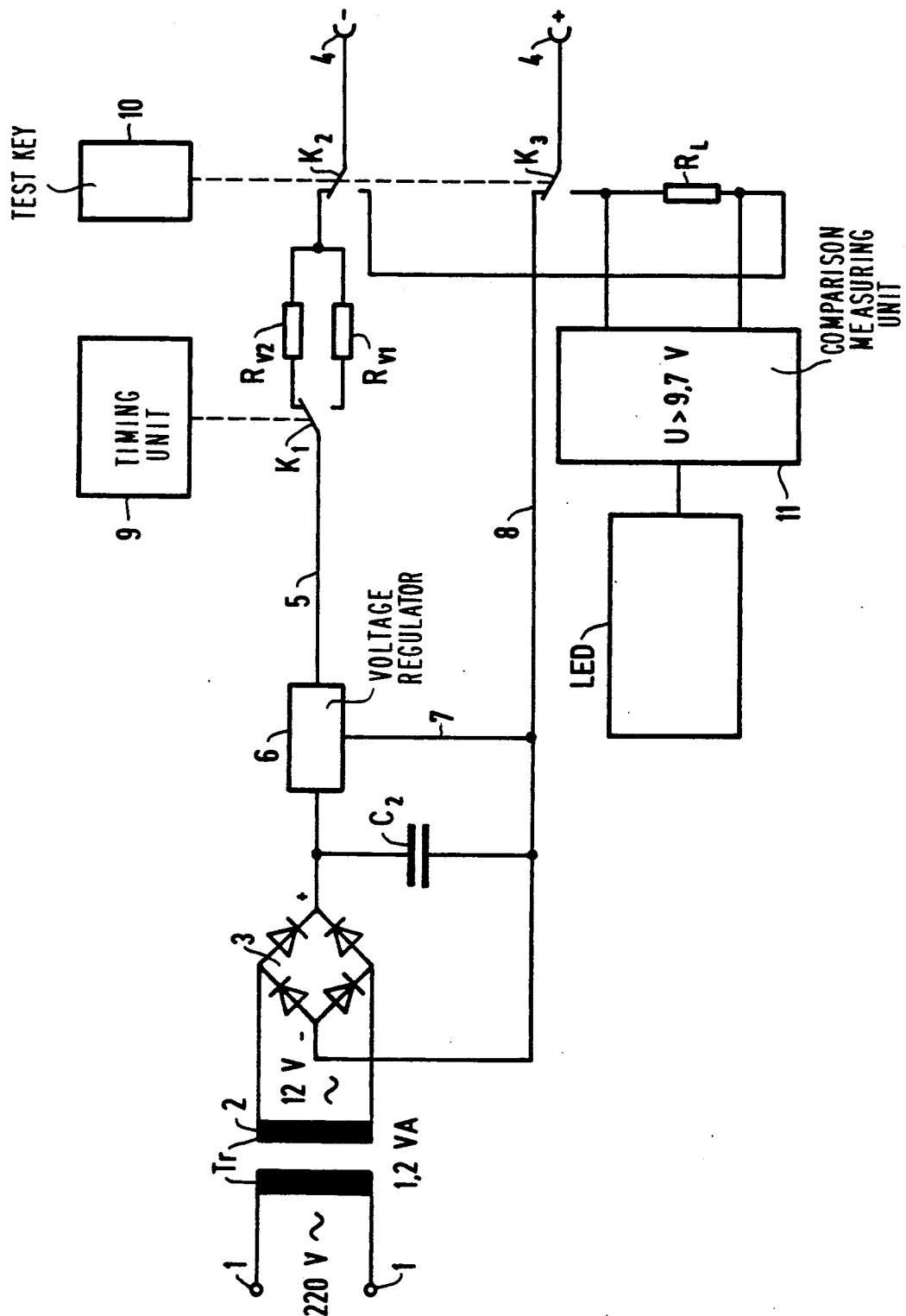

BATTERY CHARGING UNIT FOR A MEDICAL APPLIANCE

The invention relates to a battery charging unit for a medical appliance, preferably an inhalator, with a transformer that can be connected to the mains voltage and a rectifier circuit connected to the low-voltage side of the transformer. A battery charging unit of the kind described above is provided, for instance, for recharging batteries in pocket inhalators as described by Published European Application No. 0 258 637. However, for safety reasons, an empty battery which is used as prescribed must be sufficiently recharged after only three minutes, in order to provide the necessary energy for safe operation of the appliance for at least one inhalation process. On the other hand, it must be possible to provide a long-term charge of over 12 hours (up to 2 years), without damage to the battery. In addition, the user must be able to tell the charge status of the battery at any time.

It is accordingly an object of the invention to provide a battery charging unit for a medical appliance, which overcomes the hereinafore-mentioned disadvantages of the heretofore-known devices of this general type, which charges a battery associated with it completely enough within a short time that the stored energy suffices for one normal operating cycle of the appliance to be supplied, while ensuring that no damage to the battery will ensue in the case of long-term charging of over 12 hours. The charge status of the battery should also be clearly apparent at any time.

With the foregoing and other objects in view there is provided, in accordance with the invention, a battery charging unit for a medical appliance, preferably an inhalator, comprising a transformer to be connected to a mains voltage and having a low-voltage side, a rectifier connected to the low-voltage side of the transformer, a charge current circuit connected to the rectifier for charging a battery, timing control means connected to the charge current circuit for switching a charge current back to a value being safe, harmless or unobjectionable for long-term charging after a predetermined period of time at an initially higher value, a test key connected to the charge current circuit being actuatable for interrupting charging of the battery and briefly loading the battery with a given maximum current requirement for a given period of time, such as two seconds, means for measuring and comparing the voltage of the battery under load with a predetermined reference voltage after the test key is actuated, and a control light connected to the measuring and comparing means for signalling or lighting up only if the reference voltage is exceeded.

In accordance with another feature of the invention, the initially higher value of the charge current is sufficient for storing energy required for putting the appliance into operation and keeping it in operation during a given operating cycle, after a charge time of three minutes.

In accordance with a further feature of the invention, the predetermined period of time before switching the charge current to a value being safe for long-term charging is approximately 1.5 hours.

In accordance with an added feature of the invention, the initially higher charge current together with the charge current value being safe for long-term charging produce a full charge of the battery after a total of approximately 12 hours.

In accordance with an additional feature of the invention, a full charge of the battery is sufficient for inhalation purposes for 25 inhalation cycles, when used in an ultrasound atomizer for liquids.

In accordance with yet another feature of the invention, there is provided a resistor connected in series with the battery, the timing control means switching the resistor to a different value.

In accordance with a concomitant feature of the invention, there is provided a voltage regulator connected in the charge current circuit.

The invention is highly advantageous because it provides a very simple and operationally reliable way of assuring that a battery provided in a medical appliance will be ready for use for at least one operating cycle in a very short time (within three minutes) and on the other hand a long-term charge is also possible, even over a period of time exceeding 12 hours, without danger. Moreover, the aforementioned feature permits the user to quickly, reliably and unambiguously tell whether the battery is sufficiently charged or not.

Other features which are considered as characteristic for the invention are set forth in the appended claims.

Although the invention is illustrated and described herein as embodied in a battery charging unit for a medical appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a schematic and block circuit diagram of the invention.

Referring in detail to the single figure of the drawing, there are seen primary voltage terminals 1 of a transformer Tr with a rated power of approximately 1 to 2 VA, which are connected to a conventional mains or network voltage of 220 V. A secondary winding 2 of the transformer Tr carries a voltage of approximately 12 V and feeds a rectifier 3. The direct voltage output by the rectifier 3 is supplied through connecting lines 5 and 8 to terminals 4, to which a non-illustrated battery is connected. A capacitor $C_2$ is provided electrically parallel to the rectifier 3.

A voltage regulator 6 is located in the connecting line 5 and a measurement line 7 thereof is directly galvanically connected to the connecting line 8. Ohmic resistors $R_{V1}$ and $R_{V2}$ are disposed parallel to one another, between the voltage regulator 6 and the terminal 4 that carries positive potential. However, only one of these resistors at a time is connected in the current path, through a contact $K_1$. The contact $K_1$ is controlled by a timing unit 9, which switches over the contact $K_1$ from the resistor $R_{V1}$ to the resistor $R_{V2}$ three minutes after a connection of the non-illustrated battery. During the remainder of the charging time, the electrically parallel resistors $R_{V1}$ and $R_{V2}$ are continuously connected through a contact $K_2$ to the terminal 4 carrying positive potential.

A test key 10 is mechanically coupled to the contact $K_2$ and to a further contact $K_3$ located in the connecting line 8. Actuating the test key 10 switches over the contacts $K_2$ and $K_3$, so that the battery connected to the terminals 4 acts upon a load resistor $R_L$. The resistance of the load resistor $R_L$ is equivalent to the total resistance of an appliance to be supplied by the battery.

The voltage present at the load resistor $R_L$ when the test key 10 is depressed, is compared with a reference voltage in a comparison measuring unit 11. If the voltage present at the load resistor $R_L$ is above the reference voltage, for example above 9.7 V, then a display LED lights up. The lighting up of the display LED indicates that the load state of the battery connected to the terminals 4 is sufficient to supply an associated appliance with electrical energy. Such appliances are preferably medical appliances, such as inhalers or inhalators.

We claim:

1. Battery charging unit for a medical appliance, comprising a transformer having a high-voltage side to be connected to a mains voltage and having a low-voltage side, a rectifier connected to the low-voltage side of said transformer, a charge current circuit connected to said rectifier for charging a battery with a charge current at an initially relatively high value sufficient for storing energy required for putting the appliance into operation and keeping it in operation during a given operating cycle after a charge time of approximately three minutes, a resistor connected in series with the battery, timing control means connected to said charge current circuit for switching said resistor to a different value for obtaining a relatively low charge current safe for long-term charging after a predetermined period of time of approximately 1.5 hours, a test key connected to said charge current circuit for interrupting charging of the battery and loading the battery with a given maximum current requirement for a given period of time, a voltage regulator connected in said charge current circuit, means for measuring and comparing the voltage of the battery under load with a predetermined reference voltage after said test key is actuated, and a means connected to said measuring and comparing means for signalling if the reference voltage is exceeded, wherein the charge currents produce a full charge of the battery after a total of approximately 12 hours, and wherein the full charge of the battery is sufficient for inhalation purposes for approximately 25 inhalation cycles, when used in an ultrasound atomizer for liquids.

2. Battery charging unit according to claim 1, wherein said given period of time is two seconds.

3. Battery charging unit according to claim 1, wherein said signalling means are in the form of a light being lighted only if the reference voltage is exceeded.

4. Battery charging unit, comprising a transformer to be connected to a mains voltage, a rectifier connected to said transformer, a charge current circuit connected to said rectifier, terminals for connection to a battery to be charged, a resistance network, a first switch connected between said resistance network and said charge current circuit, a second switch connected between said resistance network and said terminals, timing control means connected to said first switch for switching from an initially high charge current value to another charge current value for long-term charging after a period of time of approximately 1.5 hours, a test key connected to said second switch for interrupting charging of the battery and loading the battery with a given maximum current requirement for a given period of time, means connected to said second switch for measuring and comparing the voltage of the battery under load with a predetermined reference voltage when said test key is actuated, and means connected to said measuring and comparing means for signalling if the reference voltage is exceeded.

5. Battery charging unit according to claim 4, including a voltage regulator connected in said charge current circuit.

6. Battery charging unit for a medical appliance, comprising a transformer having a high-voltage side to be connected to a mains voltage and having a low-voltage side, a rectifier connected to the low-voltage side of said transformer, a charge current circuit connected to said rectifier for charging a battery, timing control means connected to said charge current circuit for switching a charge current to a value for long-term charging after a predetermined period of time of approximately 1.5 hours at an initially higher value, a test key connected to said charge current circuit for interrupting charging of the battery and loading the battery with a given maximum current requirement for a given period of time, means for measuring and comparing the voltage of the battery under load with a predetermined reference voltage after said test key is actuated, and a means connected to said measuring and comparing means for signalling if the reference voltage is exceeded.

7. Battery charging unit according to claim 6, including a voltage regulator connected in said charge current circuit.

* * * * *